(12) United States Patent
Forbush et al.

(10) Patent No.: US 10,718,284 B2
(45) Date of Patent: Jul. 21, 2020

(54) ENGINE EMISSION STATUS-BASED MAINTENANCE

(71) Applicant: Emissions-Based Maintenance LLC, Lehi, UT (US)

(72) Inventors: Jeramiah Forbush, Lehi, UT (US); Steven Forbush, American Fork, UT (US)

(73) Assignee: Emissions-Based Maintenance LLC, Lehi, UT (US)

( * ) Notice: Subject to any disclaimer, the term of this patent is extended or adjusted under 35 U.S.C. 154(b) by 0 days.

(21) Appl. No.: 16/153,067

(22) Filed: Oct. 5, 2018

(65) Prior Publication Data

US 2020/0109677 A1 Apr. 9, 2020

(51) Int. Cl.
*F02D 41/14* (2006.01)
*G07C 5/00* (2006.01)
(Continued)

(52) U.S. Cl.
CPC ....... *F02D 41/1401* (2013.01); *F02D 41/146* (2013.01); *F02D 41/1453* (2013.01);
(Continued)

(58) Field of Classification Search
CPC ...... G07C 5/008; G07C 5/085; G07C 5/0808; G07C 5/006; G07C 5/0816; Y02T 10/47;
(Continued)

(56) References Cited

U.S. PATENT DOCUMENTS

2003/0130774 A1* 7/2003 Tripathi ................ G07C 5/008
701/31.4
2004/0204817 A1 10/2004 Yurgil
(Continued)

FOREIGN PATENT DOCUMENTS

WO 2012025681 A1 3/2012

OTHER PUBLICATIONS

Forbush, et al., "Statement of Inventors Regarding Product Development", for U.S. Appl. No. 16/153,067, Signed Dec. 18, 2018, 3 Pages.
(Continued)

*Primary Examiner* — Sizo B Vilakazi
(74) *Attorney, Agent, or Firm* — Goff IP Law PLLC; Jared Goff

(57) ABSTRACT

An engine maintenance set can be generated via a computerized system using engine status data for an internal combustion engine. The generating can include operating on the engine status data using a set of computer-readable maintenance set generation rules, with the rules correlating an engine maintenance set with a triggering condition. The generating can include determining that the triggering condition is met, with the triggering condition including each of one or more triggering parameters being within one or more corresponding triggering value ranges. The triggering parameters can include at least one engine emission triggering parameter. The generating can further include producing the engine maintenance set using the maintenance set generation rules. The generated engine maintenance set can be issued, with the engine maintenance set including one or more commands to perform one or more maintenance operations to improve efficiency of the engine and/or one or more engine status notifications.

43 Claims, 4 Drawing Sheets

SOFTWARE 180 IMPLEMENTING ENGINE EMISSION STATUS-BASED MAINTENANCE FEATURES

(51) Int. Cl.
   *G07C 5/08*    (2006.01)
   *G01M 15/10*   (2006.01)
   *F02D 41/26*   (2006.01)

(52) U.S. Cl.
   CPC ......... *F02D 41/1454* (2013.01); *F02D 41/26* (2013.01); *G01M 15/104* (2013.01); *G07C 5/006* (2013.01); *G07C 5/0808* (2013.01); *G07C 5/0816* (2013.01)

(58) Field of Classification Search
   CPC ............. F02D 41/1401; F02D 41/1453; F02D 41/1454; F02D 41/146; F02D 41/26; G01M 15/104
   See application file for complete search history.

(56) References Cited

U.S. PATENT DOCUMENTS

| | | | | |
|---|---|---|---|---|
| 2005/0173523 | A1* | 8/2005 | Yushio | F01N 11/00 235/384 |
| 2009/0076874 | A1 | 3/2009 | Gross et al. | |
| 2012/0239308 | A1* | 9/2012 | Miller | G01N 21/3504 702/24 |
| 2014/0324275 | A1 | 10/2014 | Stanek et al. | |
| 2016/0102626 | A1 | 4/2016 | Johansson et al. | |
| 2018/0137695 | A1* | 5/2018 | Sappok | F01N 3/021 |

OTHER PUBLICATIONS

"Oxygen Sensor Codes—A Complete Guide On Diagnosing Automotive Oxygen Sensors", Accessed at <<https://www.engine-light-help.com/oxygen-sensor-codes.html>>, Accessed on Sep. 29, 2018, 5 Pages.

"P2200 OBD-II Trouble Code: NOx Sensor Circuit Bank 1 | YourMechanic Advice", Accessed at <<https://www.yourmechanic.com/article/p2200-nox-sensor-circuit-bank-1-by-jerry-renshaw>>, Accessed on Sep. 29, 2018, 3 Pages.

"P2203 OBD-II Trouble Code: NOx Sensor Circuit High Input Bank 1", Accessed at <<https://www.yourmechanic.com/article/p2203-obd-ii-trouble-code-nox-sensor-circuit-high-input-bank-1-by-robert-kulp>>, Accessed on Sep. 29, 2018, 4 Pages.

"Top Five Reasons Your Check Engine Light May Be On", Accessed at <<https://www.autozone.com/landing/page.jsp?name=top-five-reasons-check-engine-light>>, Accessed on Sep. 29, 2018, 4 Pages.

"The International Search Report and the Written Opinion of the International Searching Authority", International Application No. PCT/US2019/054116, dated Dec. 18, 2019, 12 Pages.

Okika et al. "A Test Harness for a Control Software." In: Aalborg University. Jun. 2005 1-44 (Jun. 2005) Retrieved on Nov. 22, 2019 (Nov. 22, 2019) from, 85 Pages.

* cited by examiner

ENGINE EMISSION STATUS-BASED MAINTENANCE

BACKGROUND

For decades, users of internal combustion engines have struggled with engines that do not perform at levels at which the engines should be capable of performing, according to testing on models of those engines. For example, a diesel engine operating in normal working conditions may be less fuel efficient than what the engine is rated by a manufacturer or approved by regulatory bodies. Some experienced mechanics have succeeded in improving efficiency of some such engines, often through performing different maintenance actions in trial-and-error techniques that may be informed by the mechanic's experience and by the mechanic inspecting and testing the engine and its support systems.

SUMMARY

The tools and techniques discussed herein relate to computerized generating of sets of computerized engine maintenance sets that can include engine maintenance commands for internal combustion engines, such as compression ignition engines (e.g., diesel engines and natural gas engines with spark plugs). Such generating can be based on values of engine status parameters that can include emission parameters and may also include operating parameters. Using such parameters, the tools and techniques discussed herein can generate engine maintenance sets that can include maintenance commands that can be acted upon in maintenance actions on an engine to improve efficiency of the engine.

In one aspect, a technique can include monitoring status of an internal combustion engine that is used to power a vehicle during normal operation of the vehicle, such as through mechanical and/or electrical components. The monitoring can be performed via a computerized monitoring system that is programmed to perform the monitoring and that is secured to the vehicle. The monitoring can include sensing status parameters of the status of the engine, with the status parameters including one or more emission parameters that represent quantities of components of emissions from the engine and one or more operating parameters that quantify one or more non-emission-based operating parameters of the engine. The monitoring can also include encoding values for the engine status parameters in engine status data. For example, this may be done by processing analog sensor signals to produce digital data that encodes values of the analog signals. The engine status data can be sent from the monitoring system to a computerized maintenance set generator. An engine maintenance set including one or more engine maintenance commands can be generated via the computerized maintenance set generator. At least a portion of the computerized maintenance set generator may be located remotely from the vehicle. The generating can include operating on the engine status data using a set of computer-readable maintenance set generation rules, with the set generation rules correlating an engine maintenance set with a triggering condition. The results of the operating on (e.g., parsing through and analyzing) the status data can be used in determining that the triggering condition is met, with the triggering condition including each of multiple triggering parameters of the engine status parameters being within one or more corresponding triggering value ranges. The triggering parameters can include at least one operation triggering parameter of the one or more operating parameters and at least one emission triggering parameter of the one or more emission parameters. The generating can further include producing the engine maintenance set using results of the determining that the triggering condition is met. Also, the technique can include issuing the generated engine maintenance set via the computerized maintenance set generator, with the generated engine maintenance set including one or more of an engine maintenance command to perform one or more maintenance operations to improve efficiency of the engine and a status notification indicating whether a triggering parameter is outside of an acceptable value range.

In another aspect a technique can include receiving, via a computerized maintenance set generator, engine status data that encodes values of status parameters for an internal combustion engine. The engine status data can include emission status data that encodes values of one or more emission parameters that represent quantities of components of emissions from the engine and may also include operation status data that encodes values of operating parameters that quantify one or more non-emission-based operating parameters of the engine. The technique can further include generating, via the computerized maintenance set generator, an engine maintenance set including one or more engine maintenance commands using the engine status data. The generating can include operating on the engine status data using a set of computer-readable maintenance set generation rules, with the maintenance set generation rules correlating an engine maintenance set with a triggering condition. The technique can further include determining that the triggering condition is met, with the triggering condition including each of multiple triggering parameters of the status parameters being within one or more corresponding triggering value ranges. The triggering parameters can include at least one operation triggering parameter of the one or more operating parameters and at least one emission triggering parameter of the one or more emission parameters. In some implementations, the triggering condition may include at least one emission triggering parameter of the one or more emission parameters but not the at least one operation triggering parameter of the one or more operating parameters, such as where the technique may not include sensing or otherwise using the non-emission operating parameters or data encoding values of such parameters. The generating may further include producing the engine maintenance set using the maintenance set generation rules. The technique can include issuing the generated engine maintenance set via the computerized maintenance set generator, with the engine maintenance set including one or more commands to perform one or more maintenance operations to improve efficiency of the engine.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
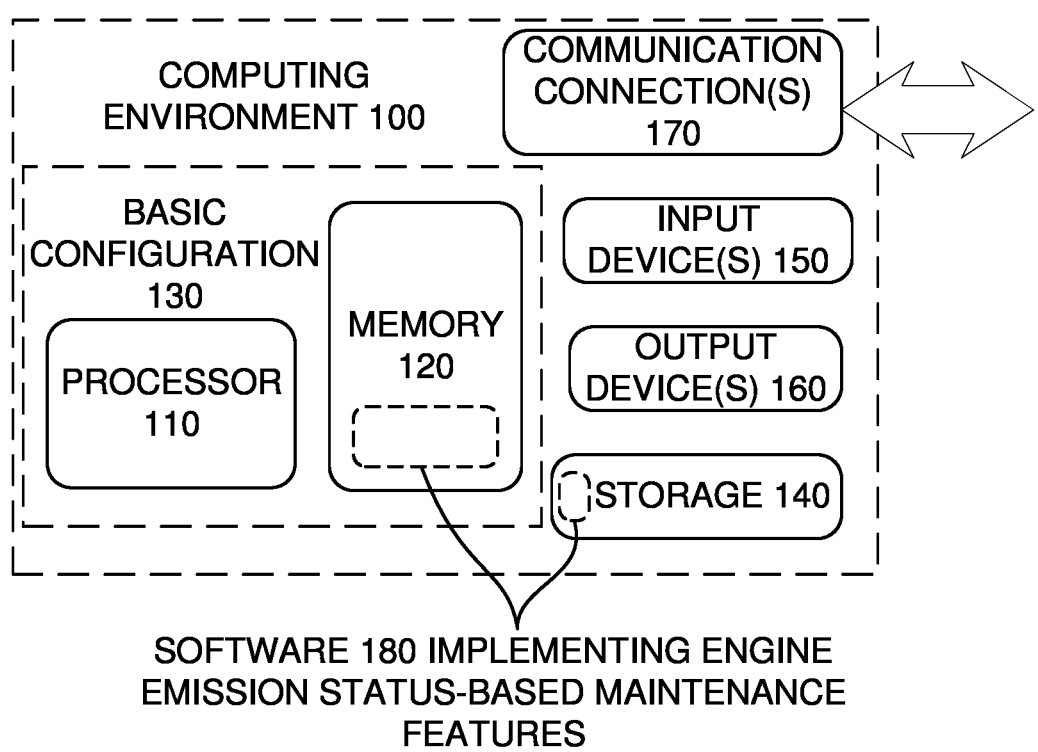
FIG. 1 is a block diagram of a suitable computing environment in which one or more of the described aspects may be implemented.

Aspects described herein are directed to techniques and tools for improved maintenance of internal combustion engines, including compression ignition engines. This can include computerized generation of commands for maintenance of internal combustion engines, such compression ignition engines, using values of sensed engine parameters including emission parameters and possibly also including non-emission operating parameters. Such improvements may result from the use of various techniques and tools separately or in combination.

Such techniques and tools may include monitoring an engine, where the monitoring can include sensing engine parameters for an engine. For example, the monitoring may be performed via a computerized monitoring system that is programmed to perform the monitoring and that is secured to a vehicle being powered by the engine. The monitoring can include sensing status parameters of the status of the engine, such as emission parameters and possibly non-emission operating parameters. For example, the monitoring may include analyzing the non-emission operating parameters to determine when conditions for a valid emission parameter test are met. If the conditions for such a test are met and if it is also determined that one or more parameters are outside an acceptable range, then a triggering condition can be met, which can trigger the generation of an engine maintenance set, which can include commands in a computer system that dictate maintenance operations to be performed on the engine (which can include maintenance performed on support systems that affect performance of the engine). Those maintenance actions can be correlated with the triggering condition that gives rise to them in a set of maintenance set generation rules. Also, the acceptable range may be set by reference to a profile for the engine, which can be part of the set generation rules and can help set the acceptable range of parameters. For example, the profile may be a profile for an engine that is set by a standard emissions test performed on the same model of engine by the manufacturer.

The set generation rules may define different triggering conditions that are met depending on the degree to which one or more of the parameters is outside the acceptable range. Each of the different triggering conditions, corresponding to different levels or degrees to which a parameter is outside an acceptable range, can be correlated to a different engine maintenance set by the set generation rules. Also, the set generation rules can define triggering conditions that correspond to engine maintenance sets including corresponding status notifications. For example, a triggering condition may include the conditions for an emission test being met by non-emission operating parameters, and all emission parameters being within acceptable ranges. That triggering condition can be correlated to produce an engine maintenance set that indicates the parameters are within acceptable value ranges. Similarly, a triggering condition that includes one or more engine parameters being outside acceptable value range(s) can be correlated to produce a maintenance set that indicates the engine parameter(s) are outside the acceptable value range(s).

The engine maintenance set can be issued, which may include transmitting the engine maintenance set and may also include presenting the engine maintenance set using a computer output device. Also, the maintenance actions dictated by maintenance commands in the engine maintenance set can be performed on the engine. This can result in the engine having improved performance, such as improved efficiency. This can also bring parameters such as emission parameters into acceptable ranges, as defined by the set generation rules. For example, such acceptable ranges may be ranges surrounding parameter values in a profile for the engine model, as discussed above. Also, the notifications in the maintenance sets can notify the system and users of the system whether parameters are outside of acceptable value ranges. All of this can be done in an efficient manner and can save time for those who maintain engines and can help to maintain those engines in ways that have not been possible prior to the tools and techniques discussed herein.

Accordingly, one or more substantial benefits can be realized from the tools and techniques described herein. As noted above, some experienced mechanics have succeeded in improving efficiency of some engines, such as through trial and error techniques. Also, some have generally suggested remotely monitoring emissions of vehicles for compliance with regulations, without providing details that would enable this to be accomplished in practiced. In contrast, the computer system and techniques discussed herein can provide engine maintenance commands for maintenance actions in an efficient manner, using computerized techniques according to the maintenance set generation rules. The system and techniques can similarly be used to provide notifications indicating whether emissions are outside of acceptable ranges, either with or without also providing maintenance commands. This can save time and effort and can avoid wasted system resources. Indeed, the system and techniques discussed herein can provide engine maintenance sets comprising commands and/or notifications that would have not been discovered at all by ordinary mechanics. Accordingly, the tools and techniques discussed herein can provide an improved computer system for remotely monitoring and analyzing engine emissions and for engine maintenance command and notification generation, and can improve maintenance of internal combustion engines, resulting in significant savings of time, fuel, increased engine life, and better running engines.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as all or part of a monitoring system (e.g., as a processing system device), a maintenance set generation system, and/or a client device. Generally, various computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing status-based engine maintenance features. An implementation of status-based engine maintenance features may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more wired and/or wireless communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, engine emission sensor, engine operation sensor, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level descriptions for operations performed by a computer and should not be confused with acts performed by a human being, unless performance of an act by a human being (such as a "user") is explicitly noted. The actual computer operations corresponding to these terms vary depending on the implementation.

II. Engine Emission Status-Based Maintenance System and Environment

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Figure 2:
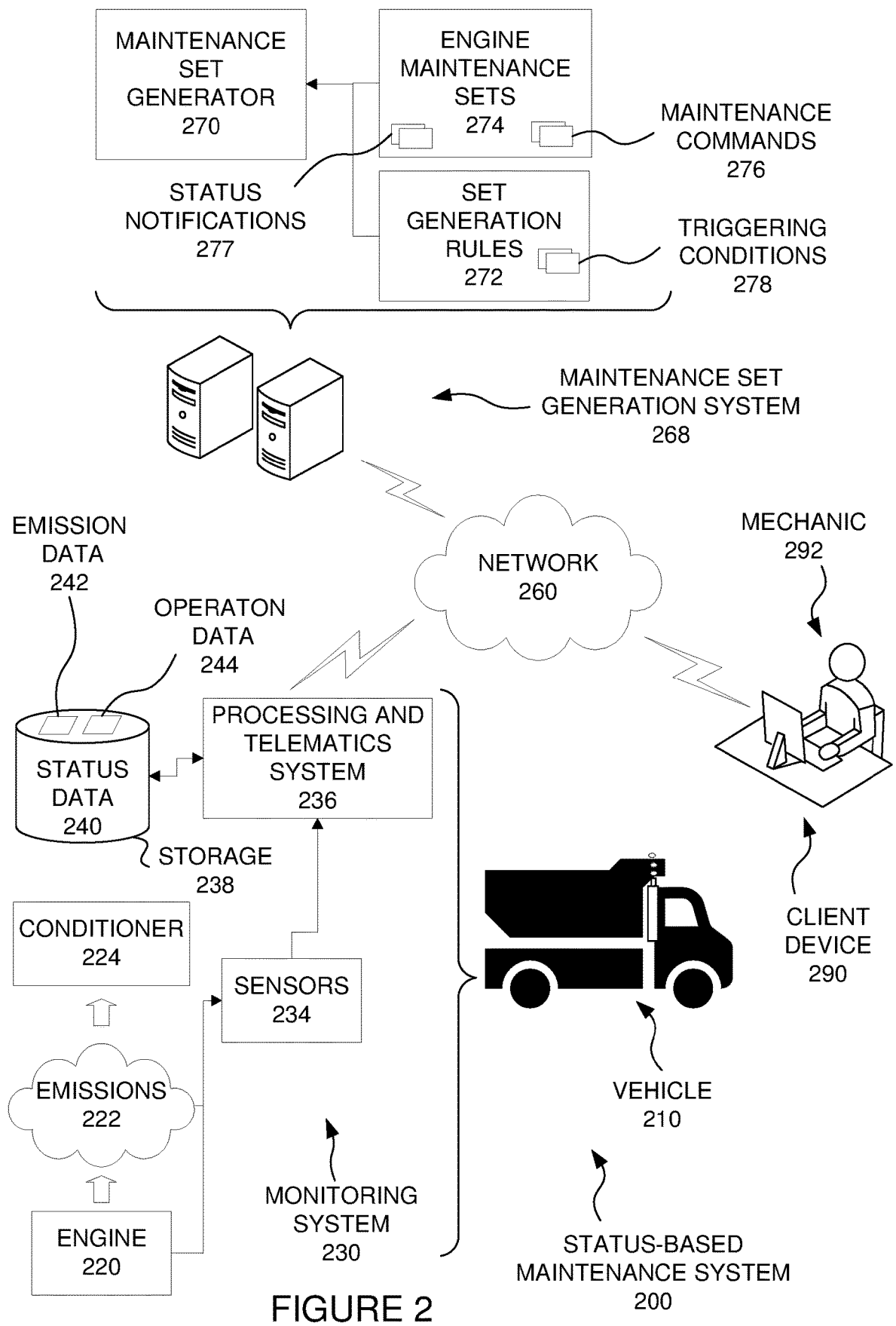
FIG. 2 is schematic diagram of a status-based engine maintenance system.

Referring now to FIG. 2, components of a computerized task guidance system (200) will be discussed. Each of the components includes mechanical and/or computer hardware and may also include software. For example, a computer component of FIG. 2 can be implemented entirely in computer hardware, such as in a system on a chip configuration. Alternatively, a component can be implemented in computer hardware that is configured according to computer software and running the computer software. The computerized components can be distributed across computing machines or grouped into a single computing machine in various ways. For example, a single component may be distributed across multiple different computing machines (e.g., with some of the operations of the component being performed on one or more client computing devices and other operations of the component being performed on one or more machines of a server). Similarly, what is shown as multiple components may be included in a single computing machine. For example, components of the monitoring and maintenance set generation systems could be included in a computing machine secured to the vehicle or located remotely from the vehicle.

With these concepts in mind components of the status-based maintenance system (200) of FIG. 2 will be discussed. The system can include a vehicle (210), which can include multiple mechanical and/or computerized components, including an engine (220). The engine (220) can be an internal combustion engine, such as a compression ignition engine (e.g., a diesel engine or a natural gas engine with spark plugs that is classified as a compression ignition engine). The engine (220) produces emissions (222), or exhaust, while it is running. Those emissions (222) can be processed by a conditioner (224) prior to exiting the vehicle, such as to remove and/or modify components of the emissions (222) that are considered harmful to the environment. For example, the conditioner (224) may include a selective catalytic reduction system, diesel particulate filter system, exhaust gas recirculation system and/or other conditioning components.

A. Monitoring System

A monitoring system (230) can be secured to the vehicle (210), although in some embodiments all or part of the monitoring system may be located remotely from the vehicle (210). The monitoring system (230) can operate to monitor engine status parameters. These status parameters can include emission parameters that can be quantifications of components of the emissions (222). For example, the emission parameters may include quantifications of oxides of nitrogen (such as NO and $NO_2$, collectively referred to herein as oxides of nitrogen or NOx) in the emissions (222). As another example, the emission parameters may include quantifications of oxygen gas (referred to herein as oxygen or $O_2$) in the emissions. As another example, the emission parameters may include quantifications of carbon dioxide gas (referred to herein as carbon dioxide or $CO_2$) in the emissions. The status parameters may also include non-emission engine operating parameters that can quantify status characteristics of the engine (220) other than emission characteristics. For example, non-emission parameters may include engine load (i.e., output torque of the engine); power being produced by the engine (such as in horsepower); revolutions per unit of time (such as revolutions per minute, or RPM); turbo boost (such as a measure of pressure produced by a turbo); fuel flow rate, and/or other non-emission parameters. Notably, the monitoring system (230) may monitor such parameters using indirect values, such as monitoring voltage produced by a sensor, with or without converting that voltage to a direct quantity, such as a percentage of a component in the emissions (222) or the actual torque output of the engine (220).

The monitoring system (230) can include sensors (234) that can sense the engine status parameters. For example, for the emission parameters, the sensors can include an $O_2$ sensor for sensing oxygen, and a NOx sensor for sensing oxides of nitrogen. These sensors (234) may be existing types of sensors that are positioned to sense raw emissions (i.e., emissions upstream of the conditioner (224)). Accordingly, the sensors (234) may include probes that are positioned in the emission stream between the engine (220) and the conditioner (224).

The sensors can also include sensors (234) for sensing non-emission operating parameters of the engine (220). For example, these operating parameter sensors can include a revolution rate (e.g., RPM) sensor, an engine load sensor, an engine power sensor, a turbo boost sensor, a fuel flow rate sensor, and/or other engine operating parameter sensors.

The sensors (234) can provide parameter values to a processing and telematics system (236), which can also be part of the monitoring system (230). The processing and telematics system (236) can receive signals from the sensors (234). For example, the sensors (234) may provide digital and/or analog signals representing sensed quantities. As an example, a sensor (234) may provide a digital and/or analog signal representing a voltage level of the sensor (234), where the voltage level varies according to the parameter being sensed. The processing and telematics system (236) can process the signals received from the sensors (234) and can forward them for further processing. The processing and telematics system (236) may also store sensed values in computerized storage (238). For example, the values can be stored as engine status data (240), which can encode the parameters representing the engine characteristics being sensed. Accordingly, the status data (240) may include emission data (242) that encodes values for emission parameters that represent quantities of components in the emissions (222). The status data (240) may also include non-emission operation data that encodes values for non-emission operating parameters of the engine (220).

The processing and telematics system (236) may include an existing engine monitoring computer for the engine (220). The processing and telematics system (236) may also include one or more additional computing devices to receive data from the sensors (234) directly and/or via the engine computer, and to store and transmit the resulting data. For example, existing engine computers can be configured to provide data from sensed values to telematics devices via a standard protocol, such as the SAE J1939 protocol, and/or a proprietary protocol for the particular type of engine (220) and/or vehicle (210).

The processing and telematics system (236) can store emission data (242) and operation data (244) repeatedly without requiring user input. For example, the processing and telematics system (236) may process and store emission data (242) and non-emission operation data (244) every ten seconds while the engine (220) is running, or at some other set interval. Each such set of data for a particular time can be referred to as a sample of status data (240), which can include emission data (242) and may also include non-emission operation data (244).

The monitoring system (230) can include a telematics device, which may store the status data (240) and may also be used by the processing and telematics system (236) to send the status data over a computer network (260) to a maintenance set generation system (268). For example, the telematics device may be configured to send the status data (240) over a Wi-Fi signal, a satellite signal, a 3-G data signal, a 4-G data signal, and/or another wireless signal. Also, the processing and telematics system (236) may include a wired data adapter to send the status data (240) to the maintenance set generation system (268) over the network (260). For example, a wired and/or wireless signal from the processing and telematics system (236) can be received by a computing device that can forward the data to the maintenance set generation system (268), such as via one or more computer networks such as the Internet.

B. Maintenance Set Generation System

The maintenance set generation system (268) can include one or more computing devices. For example, the maintenance set generation system (268) may include computing hardware and software resources running in a cloud computing service. Specifically, the maintenance set generation system (268) can include computing components that can operate together to generate maintenance commands from the engine status data (240).

The maintenance set generation system (268) can include a maintenance set generator (270), which can include computer components that are programmed to operate on the status data (240) received from the monitoring system (230). This can include storing the status data (240) in the maintenance set generation system (268), such as in one or more data structures (e.g., in one or more database tables). The maintenance set generator (270) can be programmed to operate on the status data (240) using a set of set generation rules (272). The set generation rules (272) can correlate sets of triggering conditions (278) with engine maintenance sets (274). The triggering conditions (278) may be included as part of the set generation rules (272), and the set generation rules (272) may even include the engine maintenance sets (274) in some embodiments.

Each of the engine maintenance sets (274) can include one or more maintenance commands (276) that can be issued by the maintenance set generator. For example, the set generation rules (272) may dictate evaluating whether each of a set of triggering conditions (278) in a database table is met. For each such triggering condition (278), the set generation rules (272) can indicate one or more stored locations for maintenance commands (276) in an engine maintenance set (274). For example, the data for the maintenance commands (276) may be stored in the same database table as the triggering conditions (278) or in a different database table. The triggering conditions (278) can include a computer-readable engine profile and a set of data indicating acceptable ranges and targeting ranges with reference to the profile.

As an example, the profile can be a profile that matches an engine model of the engine (220), and/or a vehicle model of the vehicle (210). For example, the profile may be a profile for an engine that is set by a standard emissions test performed on the same model of engine by the manufacturer. As an example, the profile may be an emission profile derived from an ISO 8178 emission test or some other similar test for the engine model.

Accordingly, the maintenance set generator (270) can be programmed to follow the set generation rules (272) to operate on the status data (240) to determine whether one or more of the triggering conditions (278) is met by the status data (240). If so, then the maintenance set generator (270) can be programmed to generate and issue the engine maintenance set (274) that is correlated in the set generation rules (272) with the triggering condition (278) that is met.

A triggering condition (278) can include one or more emission conditions that are met by emission data being with specified ranges. The triggering condition (278) may also include one or more non-emission operating conditions that are met by non-emission operation data (244) being within specified ranges (such as to indicate valid conditions for an emissions test for the corresponding emission conditions.

The maintenance set generator (270) can generate an engine maintenance set (274) by retrieving and processing the data for the engine maintenance set (274), as indicated by the set generation rules (272). For example, this may include retrieving the data for the engine maintenance set (274) from a database table that includes the engine maintenance set (274) and including the data for the engine maintenance set (274) in a structure that is suitable for sending to a client device (290) over the network (260). For example, this generation of the engine maintenance set may include inserting the data into a markup language document, such as a HTML or XML, and the issuing of the maintenance command may include sending the document over the network (260) to a client device (290). The client device (290) can also operate on the engine maintenance set (274), such as by formatting, rendering, and presenting the commands on a computer display and/or other type of output device (e.g., through speakers, etc.).

While the operation of the maintenance set generation system (268) and the monitoring system (230) have been described with reference to the embodiment depicted in FIG. 2 and with reference to implementing features, variations in those features and embodiments can be used. For example, rather than using an automated processing and telematics system (236), the monitoring system (230) may include a more manual system, such as by using a manually-operated emissions monitor to monitor emission parameters. This may be done while manually monitoring output from existing engine sensors for the vehicle (210) for non-emission parameters that indicate conditions are present for a valid emissions test, such as reading indications of the non-emission parameters in a cab of the vehicle (210). The values from this test may then be sent to the maintenance set generation system (268), such as by doing so via a data link to from the manual emission sensor to the maintenance set generation system (268) and/or by receiving the values through user input.

Also, parts of the monitoring system (230) that are described above as being on devices that are secured to the vehicle (210) may be located remotely from the vehicle. Similarly, parts of the maintenance set generation system (268) that are described above as being located remotely from the vehicle (210) may be located in devices secured to the vehicle. Indeed, the entire status-based maintenance system (200) may be integrated into devices that are secured to the vehicle (210).

C. Example of Specific Triggering Conditions and Engine Maintenance Sets

Some examples of specific implementations for triggering conditions (278) and corresponding engine maintenance sets (274) will now be discussed. In this example, the triggering conditions (278) can be defined with reference to an emissions profile of the engine model that is derived from a standard emission test profile for the engine model. Each triggering condition (278) that includes conditions for emission parameters can also include one or more non-emission operating parameter conditions that can indicate a match with operating conditions for the standard emission test profile. If some of the non-emission operating conditions for the test are met, but others are not, that may meet a non-emission triggering condition that can trigger the generation and issuance of a corresponding engine maintenance set (274) of maintenance commands that can address problems with the engine that may be preventing the engine from achieving the non-emission operating parameters from the standard emission test.

As an example, some types of engines undergo a standard eight-mode test that is designated by ISO 8178. Each mode of the test designates a certain RPM and horsepower target (which can be considered part of the standard profile for the engine as discussed herein), and each engine model profile from the test lists emissions output for that model of engine under those operating parameters. In one example, the emissions monitoring system (230) can collect emission data (242) for oxides of nitrogen (NOx) and oxygen ($O_2$) using an off-the-shelf emissions sensor.

Using the $O_2$ values in the emission data (242), the maintenance set generator (270) can calculate parameter values of $CO_2$ using the target values of the engine model profile at a specific mode. This can be done by estimating the value of $CO_2$ to be the difference between the aggregate value of $O_2$ and $CO_2$ for that mode, and the measured value of $O_2$ from the monitoring system (230) for the particular engine (220). For example, if the aggregate value for $O_2$ and $CO_2$ at Mode 1 is 18.3% according to the standard test profile (i.e., 18.3% of the emissions are $O_2$ and $CO_2$ for mode 1, according to the standard test results), and the emission monitoring system (230) measures $O_2$ at 9% with the non-emission operating parameters matching those of Mode 1, the maintenance set generator (270) can calculate the $CO_2$ parameter value to be 9.3% for the engine (220). This estimated $CO_2$ parameter value (9.3% in the example) can be compared to the standard test's target value for $CO_2$ (e.g., 7%), and the maintenance set generator (270) can determine whether the triggering conditions (278) are met using this calculated value for $CO_2$. Notably, instead of monitoring $CO_2$, this same condition may be tested by having the reference parameter be $O_2$, rather than $CO_2$. The reference value for $O_2$ can be set at the value for aggregate $CO_2$ plus $O_2$ from the test, minus the value of $CO_2$ from the test. Either way, the triggering parameter may be considered to be $O_2$ and/or $CO_2$. It is not expected that such a calculated value of $CO_2$ will be exactly accurate. Indeed, the values of parameters produced directly from the sensors (234) may not be exactly accurate either. However, the values can be sufficiently accurate to be used for correlating the conditions in the engine (220) with engine maintenance sets (274) that can be acted upon to perform actions on the engine to improve performance of the engine (220).

Engine profile parameters from the standard emission test can be input into the maintenance set generation system (268) to form part of the triggering conditions (278). For example, these parameters may include $CO_2$% and NOx (measured in PPM) to be used as target references in the triggering conditions. The engine profile parameters may also include and $O_2$% and optionally the aggregate $CO_2$% plus $O_2$% (or this may be calculated by the maintenance set generation system (268) by adding the reference percentage of $CO_2$% and the reference percentage of $O_2$). Other values may optionally be entered and evaluated as emission parameters or as non-emission operating parameters.

For embodiments that use automated computerized monitoring of the engine parameters, the additional values for non-emission operating parameters may also be entered to become part of the triggering conditions (278), such as by indicating a valid emission test that is a prerequisite to emission-based triggering of corresponding engine maintenance sets (274). These profile values may include a threshold load value for the engine. This may be a percentage of the full load for the engine, which can be indicated in the standard test values. The threshold load value can be a predetermined percentage of the engine load value, such as 90% of the full load value or greater for the engine model.

Accordingly, this can indicate that the triggering conditions (278) for emission-based triggering include this threshold value (90%+of full load value) for engine load. The profile values may also include a threshold value for revolutions per minute, which may be within 5% of the rate speed revolutions per minute for the engine model, according to the standard test results. For example, for an engine with an RPM rating of 1,800, a valid RPM value for a triggering condition (278) could be 1,710. Of course, different percentages and values for such threshold operating parameters in the triggering conditions (278) may be used in different embodiments.

Other non-emission operating parameters may similarly be used, such as turbo boost and/or fuel injection flow rate. Each engine model is different, and each engine model can have different values and may use different parameters to indicate valid tests. For example, additional parameters may be used to fine-tune the determination of whether the operating parameter values indicate that conditions for a valid emission test that matches the standard test are present. Similarly, older engines may have fewer operating parameters available and therefore fewer operating parameters may be used to determine a valid emissions test.

The non-emission operating parameters as indicated by the operation data (244) can be checked by the maintenance set generation system (268) prior to evaluating the corresponding emission data (242). Also, some triggering conditions (278) may not include emission parameter values. For example, if the RPM for an engine is 10% above the target RPM value from the engine model profile under specified conditions in the triggering condition (278), then the maintenance set generator can determine that a corresponding triggering condition (278) is met and can issue a corresponding engine maintenance set (274). For example, the engine maintenance set may include a command to check the alternator settings or the torque converter stall point for the engine. For example, the message "Check Alternator settings or torque converter stall point" may be inserted into a digital document and sent to the client device (290) to be displayed to the mechanic (292). The mechanic (292) can respond by performing this action on the engine (220) (which, as can be seen from this example, may include performing actions on engine support components that support the running of the engine and affect its performance). Such actions by the mechanic (292) may similarly be performed in response to engine maintenance sets (274) that are correlated with triggering conditions (278) that include emission parameter conditions. Accordingly, the mechanic (292) can use the status-based maintenance system (200) to generate and issue the engine maintenance sets (274) and can perform the maintenance actions on the vehicle (210), with the vehicle (210) being part of the system (200) that receives those maintenance actions dictated by the engine maintenance sets (274).

In an example, existing telematics devices may be used in the processing and telematics system (236) to collect data from an engine computer (such as the operation date (244) and from emission sensors (234). For example, this may be done every ten seconds, or at some other interval. This data can be collected using a protocol such as the SAE J1939 protocol or other manufacturer-specific protocol (e.g., CDL—CAT Data Link for Caterpillar® equipment). The span for indicating a valid emission test can be set based on an amount of time indicated for the standard reference emission test for the engine. For example, the span of time may be thirty seconds. Accordingly, this can indicate that valid emission test conditions for an emission triggering condition (278) are present when the operation data (244) indicates that the engine is operating within the valid test range (e.g., at least 90% of full load value and within 5% of rated RPM value) for at least thirty seconds. For example, if samples are taken every ten seconds, then three consecutive samples with the operation data (244) within the valid test ranges indicates conditions are present for a valid emission test. The emission data (242) for the last of these samples can be used to determine whether an emission-based triggering condition (278) is met. Emission data (242) from multiple such samples for valid emission test conditions may be recorded during a time period, such as within a single day where the vehicle (210) is used in normal operation.

The maintenance set generator (270) may operate on each such sample separately to determine whether its emission data (242) and operation data (244) meet the triggering conditions (278). Also, multiple samples may be aggregated (such as by taking the mean average of each of the values in the status data (240) of the multiple samples) and evaluated together (such as by determining whether the averages of the values meet the triggering conditions (278)). As an example, the maintenance set generator (270) may parse through each sample of status data (240) and determine whether the operation data (244) meets the triggering conditions for a valid emissions test. If so, then the status data (240) of that sample can be recorded in a separate data location, such as a separate data table for the time period. After that time period, the maintenance set generator (270) can aggregate all the values of the same type in the different samples of the status data (240), to produce an aggregate sample for that time period. The values in the aggregate sample can be checked to determine whether the aggregate values of the emission data (242) meet any of the emission-based triggering conditions (278).

Following are some examples of triggering conditions (278) and corresponding engine maintenance sets (274), with the descriptions of the maintenance commands (276) indicated below the descriptions of the portion of the triggering conditions (278) that applies to the emission data (242). In these examples, the engine profile refers to stored values for an engine profile that can be derived from the standard emission test results discussed above. As can be seen, in addition to maintenance commands (276), the engine maintenance sets (274) may also include other data, such as status notifications (277) (e.g., warning notices). Also, the commands (276) may be in different forms. For example, rather than having natural language text, the commands (276) may be in the form of codes that are correlated with commands for the maintenance actions to be taken, such as where the status-based maintenance system (200) includes such correlations to decode the commands (276). Also, the commands (276) may be in the form of informative statements that imply at least part of the action to be taken, or in other words the commanded action. For example, rather than saying "Check for blocked after cooler," a command (276) may state "The after cooler may be blocked." Either way, this is a command to check the after cooler for blockage, and if it is blocked, to remove the blockage in some manner. Accordingly, a command to check for a problem also includes a command to fix that problem if found, such as by replacing a component, cleaning a component, or making an adjustment to a component such as a computerized component or a mechanical component.

Elevated $CO_2$ {parameter=anything higher than 5% above the level in the engine profile}:
Caution—Elevated $CO_2$%—Engine over fueled;
Check air intake system;

Check air filters; and
Engine is being lugged (verify/increase RPM or decrease load as appropriate).

High $CO_2$ {parameter=anything higher than 10% above the level in the engine profile}:
Warning—High $CO_2$%—Engine over fueled;
Check valve train adjustment;
Check injector settings;
Verify engine calibration; and
Also include commands from the Elevated $CO_2$ engine maintenance set.

Low $CO_2$–{parameter=anything lower than 1% below the level in the engine profile}:
Engine not receiving enough fuel, check fuel settings;
Verify drawing correct power; and
Verify/reduce RPM settings.

Low NOx {parameter=anything lower than 20% below the level in the engine profile}:
Caution—Low NOx—Combustion chamber temperature too low;
Check exhaust gas temperatures against standards;
Check for low turbo boost;
Check injection timing;
Check for leaks between turbo and intake manifold; and
Check for exhaust leaks before turbo.

Very Low NOx {parameter=anything lover than 25% below the level in the engine profile}:
Warning—Low NOx—Combustion chamber temperature too low;
Check for blocked after cooler;
Check for restriction in intake;
Check air filters;
Check for waste gate malfunction; and
Also include commands from Low NOx engine maintenance set.

High NOx {parameter=anything higher than 20% above the level in the engine profile} (In some embodiments, this may be used only if the vehicle is deployed in a restrictive emissions geographic area where NOx emissions may be limited, such as a non-attainment geographic area in the United States of America. This can be indicated in the data for the vehicle in the maintenance set generation system (268).):
High NOx;
Combustion chamber temperature too high;
Check inlet air temperature output; and
Check injection timing.

The maintenance commands above can be performed by a mechanic (292), and they can be received as user input by the vehicle (210), including the engine (220) of the vehicle (210). In addition to such engine maintenance sets (274), the maintenance set generator (270) of the status-based maintenance system (200) may determine that the emission-based parameters being evaluated are within acceptable ranges. The engine maintenance sets (274) may include status notifications (277) in addition to or instead of the maintenance commands (276). Such status notifications (277) may include notifications indicating parameters that are outside acceptable ranges (e.g., a "High NOx" notification, as above). The status notifications (277) may also include notifications indicating which emission-based parameters being analyzed are within their acceptable ranges (where their values have not met the threshold values for triggering maintenance commands (276) for those parameters). For example, such a status notification (277) may state "NOx Within Specs" for oxides of nitrogen, or "$CO_2$ Within Specs" for carbon dioxide. In the examples above, such an acceptable range notification may be provided for $CO_2$ when its value is between 1% below the level in the engine profile and 5% above the level in the engine profile. Similarly, in the examples above, such an acceptable range notification may be provided for NOx when its value is between 20% below the level in the engine profile and 20% above the level in the engine profile. Such acceptable range status notifications (277) may be included in engine maintenance sets (274) along with maintenance commands (276) and possibly with status notifications (277) indicating one or more parameters that are outside their acceptable ranges in the same data samples. Indeed, the triggering conditions (278) can include a triggering condition (278) wherein the maintenance set generator (270) determines that the non-emission operating parameter values in the operation data (244) for a sample are within ranges for a valid emission test and that all the emission parameters being evaluated with the emission data (242) are within acceptable ranges. In this case, the engine maintenance set (274) being triggered can include a status notification (277) indicating that all emission parameters being analyzed are within acceptable ranges during the corresponding test period, without including maintenance commands (276) in the engine maintenance set (274).

As noted above, the specific triggering conditions (278) and engine maintenance sets (274) listed above are examples. Other different triggering conditions (278) and/or engine maintenance sets (274) may be used in different embodiments. For example, the triggering conditions may include a triggering threshold for $CO_2$ emissions that is between 1% and 15% above a standard value from the test results (where a 5% threshold is listed above), such as between 4% and 6% above the standard value. As another example, a triggering condition may include a triggering threshold for $CO_2$ that is between 0.2% and 3% below a standard value from the test results (where a 1% threshold is listed above), such as between 0.8% and 1.2% below the standard value. As another example, a triggering condition may include a triggering threshold for NOx that is between 5% and 35% above a standard value from the test results (where a 20% threshold is listed above), such as between 6% and 24% above the threshold. As yet another example, a triggering condition may include a triggering threshold for NOx that is between 5% and 35% below a standard value from the test results (where a 20% threshold and a 25% threshold are listed above), such as between 18% and 27% below the standard value.

Also, different engine maintenance sets from these can be used. Indeed, more effective triggering conditions and/or engine maintenance sets may be derived as more experience is gained with the engine-emission status-based maintenance system and techniques discussed herein.

III. Engine Emission Status-Based Maintenance Techniques

Several engine emission status-based maintenance techniques will now be discussed. Each of these techniques can be performed in a computing environment, which may also include mechanical components such as those of the vehicle discussed above. For example, each technique may be performed using a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. Features discussed in each of the techniques below may be combined with each other in any combination not precluded by the discussion herein, including combining features from a technique discussed with reference to one figure in a technique discussed with reference to a different figure. Also, a computer system may include means for performing each of the acts discussed in the context of these techniques, in different combinations.

Figure 3:
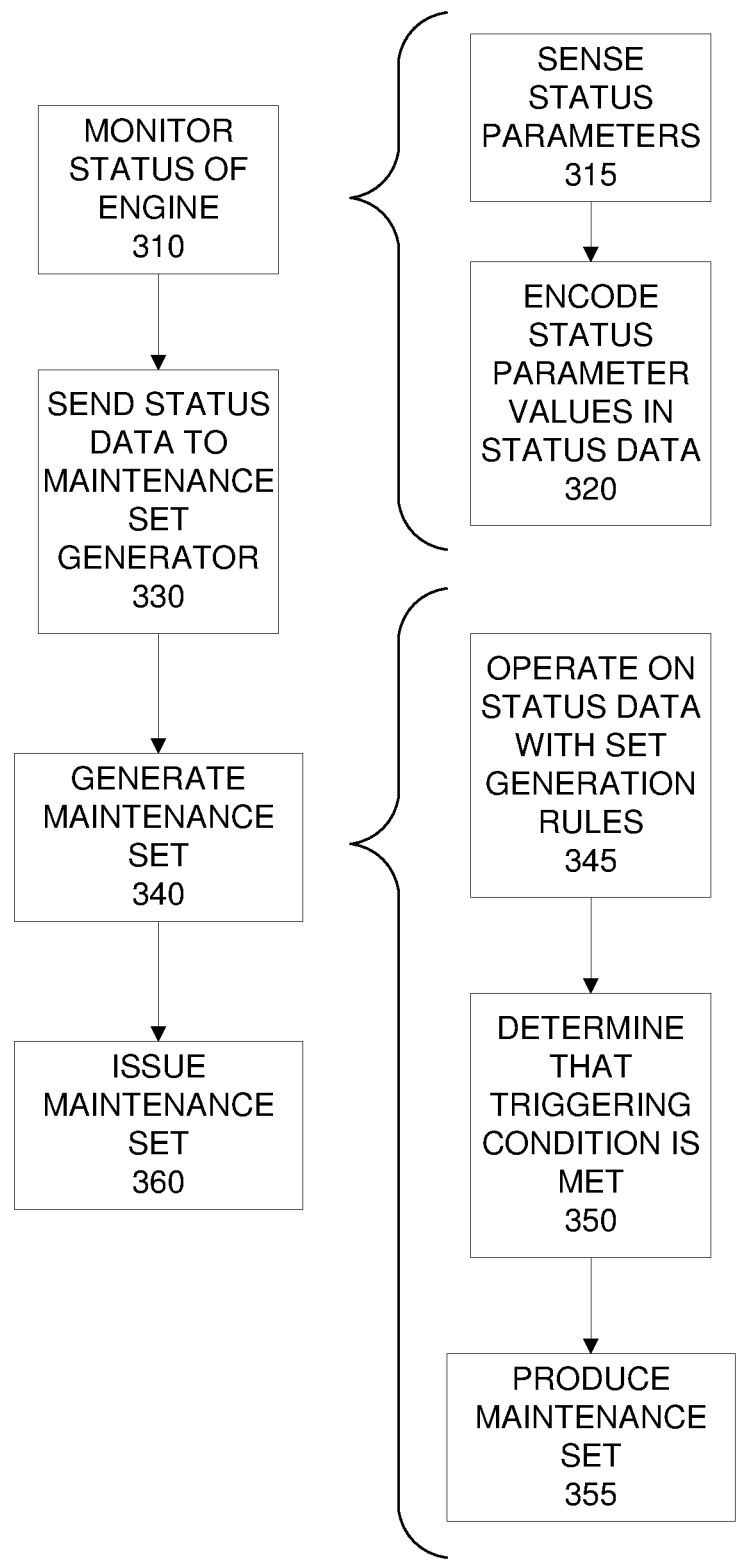
FIG. 3 is a flowchart of an engine emission status-based maintenance technique.

Referring to FIG. 3, an engine emission status-based maintenance technique will be discussed. The technique can include monitoring (310) status of an internal combustion engine that is powering a vehicle during normal operation of the vehicle. The normal operation of the vehicle includes the vehicle operating for its intended use (e.g., a dump truck hauling a load at a worksite, a hydro hoe digging in soil, a tug boat pushing a barge, etc.). The monitoring (310) can be performed via a computerized monitoring system that is programmed to perform the monitoring and that is secured to the vehicle. The monitoring (310) can include sensing (315) status parameters of the status of the engine, with the status parameters including one or more emission parameters that represent quantities of components of emissions from the engine and one or more operating parameters that quantify one or more non-emission-based operating parameters of the engine. The monitoring (310) can also include encoding values for the engine status parameters in engine status data. For example, this may be done by processing analog sensor signals to produce digital data that encodes values of the analog signals. The engine status data can be sent (330) from the monitoring system to a computerized maintenance set generator. This may be done without requiring user input between multiple instances of sending the engine status data. The technique of FIG. 3 can further include generating (340) an engine maintenance set including one or more engine maintenance commands via the computerized maintenance set generator. At least a portion of the computerized maintenance set generator may be located remotely from the vehicle. The generating (340) can include operating (345) on the engine status data using a set of computer-readable maintenance set generation rules, with the set generation rules correlating an engine maintenance set with a triggering condition. The results of the operating on the status data can be used in determining (350) that the triggering condition is met, with the triggering condition including each of multiple triggering parameters of the engine status parameters being within one or more corresponding triggering value ranges. The triggering parameters can include at least one operation triggering parameter of the one or more operating parameters and at least one emission triggering parameter of the one or more emission parameters. The generating (340) can further include producing (355) the engine maintenance set using results of the determining that the triggering condition is met. Also, the technique can include issuing (360) the generated engine maintenance set via the computerized maintenance set generator, with the generated engine maintenance set including one or more of an engine maintenance command to perform one or more maintenance operations to improve efficiency of the engine and a status notification indicating whether a triggering parameter is outside of an acceptable value range. Other features of the technique of FIG. 3 are discussed below.

The emission triggering parameters may include one or more of a measured quantity of oxides of nitrogen in emissions from the engine, a measured quantity for oxygen gas in emissions from the engine, and a measured quantity for carbon dioxide gas in emissions from the engine. The triggering condition may include the at least one operation triggering parameter being within a range that indicates conditions are met for a valid emissions test for the at least one emission triggering parameter.

The encoding (320) of the values for the engine status parameters in the engine status data can be performed repeatedly at repeated encoding instances without requiring user input between the encoding instances. Also, the sending (330) of the engine status data from the monitoring system to the maintenance set generator can be performed repeatedly at repeated sending instances without requiring user input between the sending instances. The generating (340) of the engine maintenance set can be performed repeatedly at repeated generating instances without requiring user input between the generating instances.

The triggering condition can be derived from standard emission test results for an engine model that matches the engine in the vehicle.

The sending (330) of the status data to the maintenance set generator can use a wireless data transmission device secured to the vehicle.

The engine maintenance set can include the engine maintenance command, and the technique can further include, in response to the issuing (360) of the engine maintenance set, performing on the engine at least one maintenance action that is commanded in the engine maintenance set. The at least one maintenance action can improve fuel efficiency of the engine. Also, the at least one maintenance action may alter a value of an emission parameter of the engine and bring the value of the emission parameter to an acceptable range that is outside of a range defined by the triggering condition.

The set generation rules can indicate multiple triggering conditions with each of the multiple triggering conditions having a different triggering value range for a corresponding engine status parameter, and with each of the multiple triggering conditions yielding a different engine maintenance set. For example, this may include multiple different ranges for $CO_2$ and/or multiple different ranges for NOx, as discussed above.

The generating (340) of the engine maintenance set can include determining that an acceptable emission parameter of the one or more emission parameters is within the acceptable value range. Also, the engine maintenance set can further include the status notification indicating that the acceptable emission parameter is within the acceptable value range.

The generating (340) of the engine maintenance set may include determining that an unacceptable emission parameter of the one or more emission parameters is not within the acceptable value range. The engine maintenance set can include the notification, with the notification indicating that the unacceptable emission parameter is outside the acceptable value range.

The engine maintenance set can be a first engine maintenance set, wherein the triggering condition is a first triggering condition, wherein the triggering parameters are a first set of triggering parameters, wherein the triggering value ranges are a first set of triggering value ranges, wherein the multiple triggering parameters are a first set of multiple triggering parameters, wherein the at least one operation triggering parameter is a first set of at least one operation triggering parameter, wherein the at least one emission triggering parameter is a first set of at least one emission triggering parameter, and wherein operating on the engine status data includes operating on a first set of the engine status data. The technique can further include generating, via the computerized maintenance set generator, a second engine maintenance set including one or more engine status notifications, with the second engine maintenance set being different from the first engine maintenance set. The generating of the second engine maintenance set can include operating on a second set of the engine status data using the set of computer-readable maintenance set generation rules, with the set generation rules correlating the second engine maintenance set with a second triggering condition that is different from the first triggering condition. The generating of the second engine maintenance set can also include determining that the second triggering condition is met using results of the operating on the second set of status data, with the second triggering condition including each of a second set of multiple triggering parameters of the engine status parameters being within a second set of one or more corresponding triggering value ranges, and with the second set of triggering parameters including a second set of at least one operation triggering parameter of the one or more operating parameters and a second set of at least one emission triggering parameter of the one or more emission parameters. The generating of the second engine maintenance set can also include producing the second engine maintenance set using results of the determining that the second triggering condition is met. Also, the technique can further include issuing the generated second engine maintenance set via the computerized maintenance set generator, with the generated engine maintenance set including the one or more status notifications indicating that all evaluated emission triggering parameters are within one or more acceptable value ranges.

Figure 4:
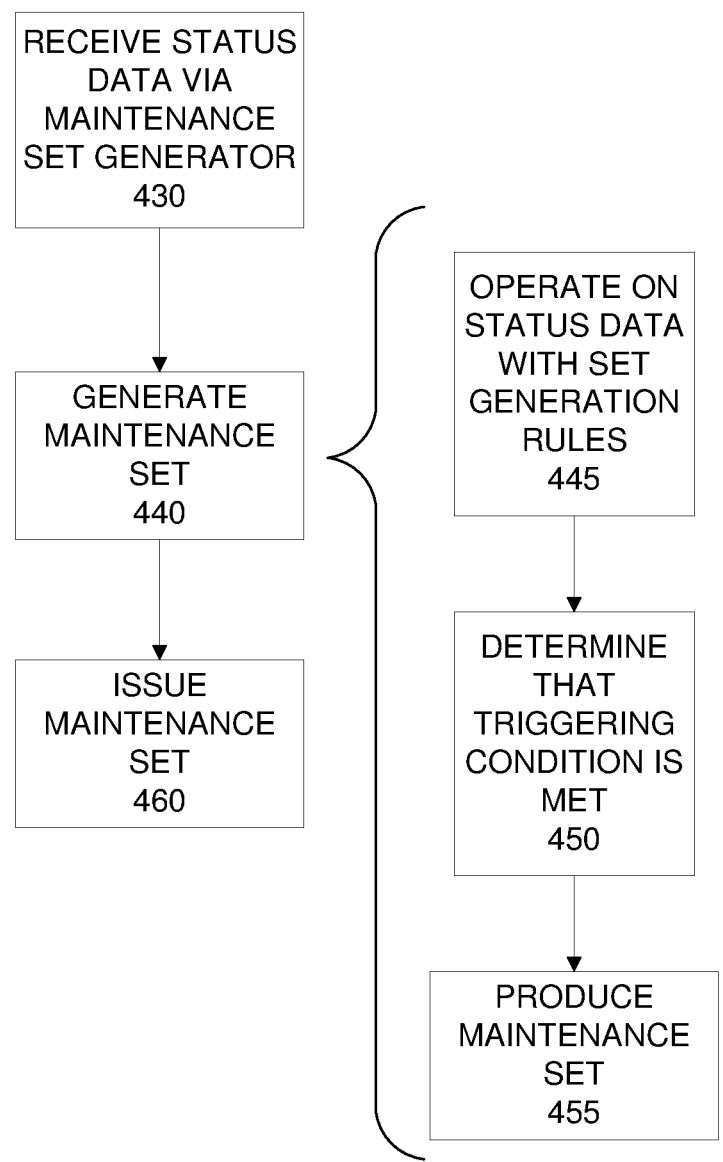
FIG. 4 is a flowchart of another engine emission status-based maintenance technique.

Referring now to FIG. 4, another engine emission status-based maintenance technique will be discussed. The technique can include receiving (430), via a computerized maintenance set generator, engine status data that encodes values of status parameters for an internal combustion engine. The engine status data can include emission status data that encodes values of one or more emission parameters that represent quantities of components of emissions from the engine, and may also include operation status data that encodes values of operating parameters that quantify one or more non-emission-based operating parameters of the engine. The technique of FIG. 4 can further include generating (440), via the computerized maintenance set generator, an engine maintenance set including one or more engine maintenance commands using the engine status data. The generating (440) can include operating (445) on the engine status data using a set of computer-readable maintenance set generation rules, with the maintenance set generation rules correlating an engine maintenance set with a triggering condition. The technique can further include determining (450) that the triggering condition is met, with the triggering condition including each of multiple triggering parameters of the status parameters being within one or more corresponding triggering value ranges. The triggering parameters can include at least one operation triggering parameter of the one or more operating parameters and at least one emission triggering parameter of the one or more emission parameters. In some implementations, the triggering condition may include at least one emission triggering parameter of the one or more emission parameters but not the at least one operation triggering parameter of the one or more operating parameters, such as where the technique may not include sensing or otherwise using the non-emission operating parameters or data encoding values of such parameters. The generating (440) may further include producing (455) the engine maintenance set using results of the determining that the triggering condition is met and using the maintenance set generation rules. The technique can include issuing (460) the generated engine maintenance set via the computerized maintenance set generator, with the engine maintenance set including one or more commands to perform one or more maintenance operations to improve efficiency of the engine.

The technique of FIG. 4 may also include sensing the status parameters of the engine while the engine is operating and encoding the values of the status parameters in the engine status data via a computerized monitoring system, which can be programmed to perform the monitoring. The receiving (430) of the engine status data can include receiving the engine status data from the monitoring system.

The receiving (430) of the engine status data can include receiving the engine status data at least partially over a wireless signal.

The at least one emission triggering parameter can include one or more of a measured quantity of oxides of nitrogen in emissions from the engine, a measured quantity for oxygen gas in emissions from the engine, and a measured quantity for carbon dioxide gas in emissions from the engine (which may be measured by sensing a quantity for oxygen and calculating the value for carbon dioxide from that oxygen quantity, as discussed above).

The triggering condition can define a threshold of an output value from a sensor of an emission component, where the threshold value is not indicative of a failure of the sensor or of an engine emissions conditioning system for emissions from the engine. In other words, the acceptable range defined by the threshold value can be wide enough that reaching the threshold can indicate one or more maintenance actions is to be taken to improve efficiency of the engine, but narrow enough that reaching the threshold does not typically indicate something is wrong with the devices for sensing the parameters being analyzed.

The triggering condition may include a triggering threshold for carbon dioxide emissions that is between 1% and 15% above a standard value, wherein the standard value is a standard value from an emissions test of an engine model that matches the engine. The triggering condition may include a triggering threshold for carbon dioxide emissions that is between 0.2% and 3% below a standard value, wherein the standard value is a standard value from an emissions test of an engine model that matches the engine. Also, the triggering condition may include a triggering threshold for oxides of nitrogen emissions that is between 5% and 35% above a standard value, wherein the standard value is a standard value from an emissions test of an engine model that matches the engine. The triggering condition may include a triggering threshold for oxides of nitrogen emissions that is between 5% and 35% below a standard value, wherein the standard value is a standard value from an emissions test of an engine model that matches the engine.

The triggering condition can be a first triggering condition, where the set generation rules include the first triggering condition that includes a first triggering threshold for carbon dioxide in emissions that is between 1% and 15% above a standard value, and a second triggering condition that includes a second triggering threshold for carbon dioxide in emissions that is between 0.2% and 3% below the standard value. The set generation rules can correlate the first triggering condition with a first engine maintenance set and can correlate the second triggering condition with a second engine maintenance set that is different from the first engine maintenance set. In one embodiment, the first triggering threshold for carbon dioxide can be between 0.8% and 1.2% below the standard value and the second triggering threshold for carbon dioxide can be between 4% and 6% above the standard value.

In another example, the triggering condition of the FIG. 4 technique can be a first triggering condition, with the set generation rules including the first triggering condition that includes a first triggering threshold for oxides of nitrogen in emissions that is between 5% and 35% above a standard value. The set generation rules can also include a second triggering threshold for carbon dioxide in emissions that is between 5% and 35% below the standard value. The set generation rules can correlate the first triggering condition with a first engine maintenance set and can correlate the second triggering condition with a second engine maintenance set that is different from the first engine maintenance set. In one example, the first triggering threshold for oxides of nitrogen can be between 16% and 24% above the standard value and the second triggering threshold for oxides of nitrogen can be between 18% and 27% below the standard value.

The generating (440) of the engine maintenance set can include generating the engine maintenance set without requiring user input.

The triggering condition can be derived from values from standard emission test results for an engine model that matches the engine.

The set generation rules can indicate multiple triggering conditions with each of the multiple triggering conditions having a different triggering value range for a corresponding emission triggering parameter (e.g., multiple different triggering value ranges for $CO_2$), and with each of the multiple triggering conditions yielding a different engine maintenance set.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of improving engine performance, the method comprising:
    monitoring status of an internal combustion engine that is powering a vehicle during normal operation of the vehicle, with the monitoring being performed via a computerized monitoring system that is programmed to perform the monitoring and that is secured to the vehicle, and with the monitoring comprising:
        sensing engine status parameters, with the engine status parameters including one or more emission parameters that represent quantities of components of emissions from the engine and one or more operating parameters that quantify one or more non-emission-based operation status quantities of the engine; and
        encoding values for the engine status parameters in engine status data;
    sending the engine status data from the monitoring system to a computerized maintenance set generator;
    generating, via the computerized maintenance set generator, an engine maintenance set, and with the generating comprising:
        operating on the engine status data using a set of computer-readable maintenance set generation rules, with the maintenance set generation rules correlating an engine maintenance set with a triggering condition; and
        using results of the operating on the engine status data, determining that the triggering condition is met, with the triggering condition comprising each of multiple triggering parameters of the engine status parameters being within one or more corresponding triggering value ranges, with the triggering parameters comprising at least one operation triggering parameter of the one or more operating parameters and at least one emission triggering parameter of the one or more emission parameters, wherein the maintenance set generation rules indicate multiple triggering conditions, with each of the multiple triggering conditions comprising a different triggering value range for an emission triggering parameter, and with each of the multiple triggering conditions yielding a different engine maintenance set; and
        using results of the determining that the triggering condition is met, producing the engine maintenance set; and
    issuing the generated engine maintenance set via the computerized maintenance set generator, with the generated engine maintenance set comprising one or more of an engine maintenance command to perform one or more maintenance operations to improve efficiency of the engine and a status notification indicating whether a triggering parameter is outside of an acceptable value range.

2. The method of claim 1, wherein the maintenance set comprises the engine maintenance command.

3. The method of claim 1, wherein the emission triggering parameter comprises one or more of a measured quantity of oxides of nitrogen in emissions from the engine, a measured quantity for oxygen gas in emissions from the engine, and a measured quantity for carbon dioxide gas in emissions from the engine.

4. The method of claim 1, wherein the triggering condition comprises the at least one operation triggering parameter being within a range that indicates conditions are met for a valid emissions test for the at least one emission triggering parameter.

5. The method of claim 1, wherein the encoding of the values for the engine status parameters in the engine status data is performed repeatedly at repeated encoding instances without requiring user input between the encoding instances.

6. The method of claim 1, wherein the sending of the engine status data from the monitoring system to the maintenance set generator is performed repeatedly at repeated sending instances without requiring user input between the sending instances.

7. The method of claim 1, wherein the generating of the engine maintenance set is performed repeatedly at repeated generating instances without requiring user input between the generating instances.

8. The method of claim 1, wherein the triggering condition is derived from standard emission test results for an engine model, wherein the standard emission test results are results from one or more engines other than the engine for which the one or more commands are to perform the one or more maintenance operations to improve efficiency of the engine.

9. The method of claim 1, wherein the sending of the engine status data to the maintenance set generator uses a wireless data transmission device secured to the vehicle.

10. The method of claim 1, wherein the maintenance set comprises the engine maintenance command, and wherein the method further comprises, in response to the issuing of the engine maintenance set, performing on the engine at least one maintenance action that is commanded in the engine maintenance command.

11. The method of claim 10, wherein the at least one maintenance action improves fuel efficiency of the engine.

12. The method of claim 10, wherein the at least one maintenance action alters a value of an emission parameter of the engine and brings the value of the emission parameter to an acceptable range that is outside of a range defined by the triggering condition.

13. The method of claim 1, wherein the generating of the engine maintenance set comprises determining that an acceptable emission parameter of the one or more emission parameters is within the acceptable value range, and wherein the engine maintenance set comprises the notification, with the notification indicating that the acceptable emission parameter is within the acceptable value range.

14. The method of claim 1, wherein the generating of the engine maintenance set comprises determining that an unacceptable emission parameter of the one or more emission parameters is not within the acceptable value range, and wherein the engine maintenance set comprises the notification, with the notification indicating that the unacceptable emission parameter is outside the acceptable value range.

15. The method of claim 1, wherein the engine maintenance set is a first engine maintenance set, wherein the triggering condition is a first triggering condition, wherein the triggering parameters are a first set of triggering parameters, wherein the triggering value ranges are a first set of triggering value ranges, wherein the multiple triggering parameters are a first set of multiple triggering parameters, wherein the at least one operation triggering parameter is a first set of at least one operation triggering parameter, wherein the at least one emission triggering parameter is a first set of at least one triggering parameter, wherein operating on the engine status data comprises operating on a first set of the engine status data, and wherein the method further comprises:
   generating, via the computerized maintenance set generator, a second engine maintenance set comprising one or more engine status notifications, with the second engine maintenance set being different from the first engine maintenance set, with the generating comprising:
      operating on a second set of the engine status data using the set of computer-readable maintenance set generation rules, with the maintenance set generation rules correlating the second engine maintenance set with a second triggering condition that is different from the first triggering condition; and
      using results of the operating on the second set of the engine status data, determining that the second triggering condition is met, with the second triggering condition comprising each of a second set of multiple triggering parameters of the engine status parameters being within a second set of one or more corresponding triggering value ranges, and with the second set of multiple triggering parameters comprising a second set of at least one operation triggering parameter of the one or more operating parameters and a second set of at least one emission triggering parameter of the one or more emission parameters; and
      using results of the determining that the second triggering condition is met, producing the second engine maintenance set; and
   issuing the generated second engine maintenance set via the computerized maintenance set generator, with the generated engine maintenance set comprising the one or more status notifications indicating that all evaluated emission triggering parameters are within one or more acceptable value ranges.

16. A system comprising:
   at least one processor; and
   memory comprising instructions stored thereon that when executed by at least one processor cause at least one processor to perform acts comprising:
      receiving, via a computerized maintenance set generator, engine status data that encodes values of engine status parameters for an internal combustion engine, with the engine status data comprising emission status data that encodes values of one or more emission parameters that represent quantities of components of emissions from the engine, and operation status data that encodes values of operating parameters that quantify one or more non-emission-based operating parameters of the engine; and
      generating, via the computerized maintenance set generator, an engine maintenance set comprising one or more engine maintenance commands using the engine status data, with the generating comprising:
         operating on the engine status data using a set of computer-readable maintenance set generation rules, with the maintenance set generation rules correlating an engine maintenance set with a triggering condition;
         using results of the operating on the engine status data, determining that the triggering condition is met, with the triggering condition comprising each of multiple triggering parameters of the engine status parameters being within one or more corresponding triggering value ranges, with the triggering parameters comprising at least one operation triggering parameter of the one or more operating parameters and at least one emission triggering parameter of the one or more emission parameters, wherein the maintenance set generation rules indicate multiple triggering conditions, with each of the multiple triggering conditions comprising a different triggering value range for an emission triggering parameter, and with each of the multiple triggering conditions yielding a different engine maintenance set; and
         using results of the determining that the triggering condition is met, producing the engine maintenance set using the maintenance set generation rules; and
      issuing the generated engine maintenance set via the computerized maintenance set generator, with the engine maintenance set comprising one or more commands to perform one or more maintenance operations to improve efficiency of the engine.

17. The system of claim 16, wherein the system is an overall system that further comprises:
   a vehicle powered by the internal combustion engine; and
   a computerized monitoring system that is programmed to perform monitoring of a status of the vehicle, and with at least a portion of the monitoring system being secured to the vehicle, with the monitoring comprising:
      sensing the engine status parameters of the engine while the engine is operating; and
      encoding the values of the engine status parameters in the engine status data via the monitoring system, wherein the receiving of the engine status data comprises receiving the engine status data from the monitoring system.

18. The system of claim 17, wherein the receiving of the engine status data comprises receiving the engine status data at least partially over a wireless signal.

19. The system of claim 16, wherein the at least one emission triggering parameter comprises one or more of a measured quantity of oxides of nitrogen in emissions from the engine, a measured quantity for oxygen gas in emissions from the engine, and a measured quantity for carbon dioxide gas in emissions from the engine.

20. The system of claim 16, wherein the triggering condition defines a threshold of an output value from a sensor of an emission component, where the threshold of the output value is not indicative of a failure of the sensor or of an engine emissions conditioning system for emissions from the engine.

21. The system of claim 20, wherein the triggering condition comprises a triggering threshold for carbon dioxide emissions that is between 1% and 15% above a standard value, wherein the standard value is a standard value from an emissions test of an engine model that matches the engine.

22. The system of claim 20, wherein the triggering condition comprises a triggering threshold for carbon dioxide emissions that is between 0.2% and 3% below a standard value, wherein the standard value is a standard value from an emissions test of an engine model that matches the engine.

23. The system of claim 20, wherein the triggering condition comprises a triggering threshold for oxides of nitrogen emissions that is between 5% and 35% above a standard value, wherein the standard value is a standard value from an emissions test of an engine model that matches the engine.

24. The system of claim 20, wherein the triggering condition comprises a triggering threshold for oxides of nitrogen emissions that is between 5% and 35% below a standard value, wherein the standard value is a standard value from an emissions test of an engine model that matches the engine.

25. The system of claim 16, wherein the triggering condition is a first triggering condition, and wherein the maintenance set generation rules comprise the first triggering condition that comprises a first triggering threshold for carbon dioxide in emissions that is between 1% and 15% above a standard value, and a second triggering condition that comprises a second triggering threshold for carbon dioxide in emissions that is between 0.2% and 3% below the standard value, with the maintenance set generation rules correlating the first triggering condition with a first engine maintenance set and with the maintenance set generation rules correlating the second triggering condition with a second engine maintenance set that is different from the first engine maintenance set.

26. The system of claim 25, wherein the first triggering threshold for carbon dioxide is between 0.8% and 1.2% below the standard value and the second triggering threshold for carbon dioxide is between 4% and 6% above the standard value.

27. The system of claim 16, wherein the triggering condition is a first triggering condition, and wherein the maintenance set generation rules comprise the first triggering condition that comprises a first triggering threshold for oxides of nitrogen in emissions that is between 5% and 35% above a standard value, and a second triggering condition that comprises a second triggering threshold for oxides of nitrogen in emissions that is between 5% and 35% below the standard value, with the maintenance set generation rules correlating the first triggering condition with a first engine maintenance set and with the maintenance set generation rules correlating the second triggering condition with a second engine maintenance set that is different from the first engine maintenance set.

28. The system of claim 27, wherein the first triggering threshold for oxides of nitrogen is between 16% and 24% above the standard value and the second triggering threshold for oxides of nitrogen is between 18% and 27% below the standard value.

29. The system of claim 16, wherein the triggering condition is derived from values from standard emission test results for an engine model, wherein the standard emission test results are results from one or more engines other than the engine for which the one or more commands are to perform the one or more maintenance operations to improve efficiency of the engine.

30. A computer-implemented method comprising:
receiving, via a computerized maintenance set generator, engine status data that encodes values of one or more engine status parameters for an internal combustion engine, with the engine status data comprising emission status data that encodes values of one or more emission parameters that represent quantities of components of emissions from the engine; and generating, via the computerized maintenance set generator, an engine maintenance set comprising one or more engine maintenance commands using the engine status data, with the generating comprising:
operating on the engine status data using computer-readable maintenance set generation rules, with the maintenance set generation rules correlating an engine maintenance set with a triggering condition, wherein the triggering condition defines a threshold of an output value from a sensor of an emission component; using results of the operating on the engine status data, determining that the triggering condition is met, with the triggering condition comprising each of one or more triggering parameters of the one or more engine status parameters being within one or more corresponding triggering value ranges, with the one or more triggering parameters comprising at least one emission triggering parameter of the one or more emission parameters, wherein the maintenance set generation rules indicate multiple triggering conditions, with each of the multiple triggering conditions comprising a different triggering value range for an emission triggering parameter and with each of the multiple triggering conditions yielding a different engine maintenance set; and using results of the determining that the triggering condition is met, producing the engine maintenance set using the maintenance set generation rules; and issuing the generated engine maintenance set via the computerized maintenance set generator, with the engine maintenance set comprising one or more commands to perform one or more maintenance operations to improve efficiency of the engine.

31. The method of claim 30, wherein the engine status data further comprises operation status data that encodes values of operating parameters that quantify one or more non-emission-based operating parameters of the engine, wherein the one or more triggering parameters further comprise at least one operation triggering parameter of the one or more operating parameters.

32. The method of claim 30, wherein the at least one emission triggering parameter comprises a carbon dioxide triggering parameter, and wherein determining that the triggering condition is met comprises calculating a value for the carbon dioxide triggering parameter, with the calculating being based on a difference between a value for an oxygen quantity in the engine status data and a value for a total quantity of oxygen and carbon dioxide derived from standard emission test results.

33. The method of claim 30, further comprising:
performing the following via a computerized monitoring system that is secured to a vehicle powered by the engine:
sensing the one or more engine status parameters of the engine while the engine is operating; and
encoding values of the engine status parameters in the engine status data, wherein the receiving of the engine status data comprises receiving the engine status data from the monitoring system.

34. The method of claim 30, wherein the receiving of the engine status data comprises receiving the engine status data at least partially over a wireless signal.

35. The method of claim 30, wherein the one or more triggering parameters comprise one or more of a level for oxides of nitrogen in emissions from the engine, a level for oxygen in emissions from the engine, and a level for carbon dioxide in emissions from the engine.

36. The method of claim 30, wherein the generating of the engine maintenance set is performed without requiring user input.

37. The method of claim 30, wherein the triggering condition is derived from standard emission test results for an engine model, wherein the standard emission test results are results from one or more engines other than the engine for which the one or more commands are to perform the one or more maintenance operations to improve efficiency of the engine.

38. The method of claim 30, wherein the maintenance set generation rules indicate multiple triggering conditions with each of the multiple triggering conditions having a different triggering value range for a corresponding emission triggering parameter and with each of the multiple triggering conditions yielding a different engine maintenance set.

39. The method of claim 30, further comprising, in response to the issuing of the engine maintenance set, performing, via a mechanic, on the engine at least one maintenance action that is commanded in the engine maintenance set.

40. The method of claim 30, wherein the one or more natural language engine maintenance commands comprise multiple natural language commands to perform multiple tasks.

41. The method of claim 30, wherein the one or more natural language engine maintenance commands comprise one or more natural language commands to check one or more potential problems with the engine, and wherein the one or more natural language commands to check the one or more potential problems specify the one or more potential problems with the engine in natural language.

42. The method of claim 1, wherein the sensing of the engine status parameters comprises sensing the one or more emission parameters from raw emissions upstream of a conditioner that is configured to process an emission stream from the internal combustion engine.

43. The method of claim 1, wherein at least part of the generating of the engine maintenance set is performed remotely from the vehicle.

* * * * *